(12) United States Patent
Mine et al.

(10) Patent No.: US 12,449,894 B2
(45) Date of Patent: Oct. 21, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Ryutaro Mine, Kanagawa (JP); Naomasa Takahashi, Chiba (JP); Shihhao Wen, Los Angeles, CA (US); Masamoto Horikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/686,075

(22) PCT Filed: Feb. 18, 2022

(86) PCT No.: PCT/JP2022/006581
§ 371 (c)(1),
(2) Date: Feb. 23, 2024

(87) PCT Pub. No.: WO2023/032264
PCT Pub. Date: Mar. 9, 2023

(65) Prior Publication Data
US 2024/0370079 A1    Nov. 7, 2024

(30) Foreign Application Priority Data

Sep. 3, 2021 (JP) ................................. 2021-143758

(51) Int. Cl.
*G06F 3/01* (2006.01)
*G06T 19/00* (2011.01)
*H04L 9/40* (2022.01)

(52) U.S. Cl.
CPC ............ *G06F 3/011* (2013.01); *G06T 19/006* (2013.01); *H04L 63/04* (2013.01)

(58) Field of Classification Search
CPC .......... G06T 19/006; G06F 3/011; G06F 3/01; A63F 13/75; A63F 13/825; A63F 13/79; A63F 13/65; H04L 63/04
See application file for complete search history.

(56) References Cited

U.S. PATENT DOCUMENTS 9,159,151 B2 * 10/2015 Perez ................. H04N 21/4781
10,338,811 B2 * 7/2019 Tarrago ..................... G06F 3/03
(Continued)

FOREIGN PATENT DOCUMENTS

| JP | 2005-216218 A | 8/2005 |
| JP | 2009-140492 A | 6/2009 |

(Continued)

*Primary Examiner* — Olga V Merkoulova
(74) *Attorney, Agent, or Firm* — Paratus Law Group, PLLC

(57) ABSTRACT

Provided are an information processing apparatus, an information processing method, and a program capable of causing a virtual object associated with a user in a virtual space to perform a more natural behavior even in a case of non-operation by the user. The information processing apparatus including a control unit that controls a behavior of a virtual object associated with a user in a virtual space in accordance with an operation of the user, in which the control unit performs control to generate the behavior of the virtual object on the basis of sensing data in a real space of the user and reflect the behavior in the virtual object during a non-operation period of the user.

13 Claims, 7 Drawing Sheets

(56) References Cited

U.S. PATENT DOCUMENTS

| | | | | |
|---|---|---|---|---|
| 10,453,259 B2* | 10/2019 | Abe | ........................ | G06F 3/0346 |
| 2009/0300525 A1* | 12/2009 | Jolliff | ................ | H04M 1/72427 |
| | | | | 715/764 |
| 2011/0007079 A1* | 1/2011 | Perez | ........................ | A63F 13/56 |
| | | | | 345/473 |
| 2015/0356787 A1* | 12/2015 | Abe | ........................ | G06F 3/011 |
| | | | | 345/633 |
| 2017/0038968 A1* | 2/2017 | Tarrago | ................... | G06T 19/20 |
| 2018/0322681 A1* | 11/2018 | Inomata | ................ | A63F 13/211 |

FOREIGN PATENT DOCUMENTS

| | | | | | |
|---|---|---|---|---|---|
| JP | 2012-511187 | A | | 5/2012 | |
| JP | 2014-036874 | A | | 2/2014 | |
| JP | 2015-505249 | A | | 2/2015 | |
| JP | 2019-061434 | A | | 4/2019 | |
| JP | 2020101950 | A | | 7/2020 | |
| JP | 2021000387 | A | | 1/2021 | |
| KR | 20210056491 | A | * | 9/2021 | ........... A61B 5/7445 |
| WO | WO-2011008659 | A2 | | 1/2011 | |

\* cited by examiner

FIG. 5

| AVATAR BEHAVIOR (AUTONOMOUS BEHAVIOR) | SENSING DATA OF USER IN REAL SPACE ||||||||||
|---|---|---|---|---|---|---|---|---|---|---|
| | STATE |||| POSITION ||||||
| | WALK | STAND | SIT | SLEEP | HOME ||| SHOP | RESTAURANT | STREET |
| | | | | | LIVING ROOM | BED ROOM ||||| 
| MEAL | | | ○ | | ○ | | | | ○ | |
| DEFEAT THE ENEMY | ○ | ○ | | | | | | | | ○ |
| SHOPPING | ○ | ○ | | | | | | ○ | | |
| SLEEP | | | | ○ | | ○ | | | | |
| WORK | | | ○ | | | | | | | |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/006581 (filed on Feb. 18, 2022) under 35 U.S.C. § 371, which claims priority to Japanese Patent Application No. 2021-143758 (filed on Sep. 3, 2021), which are all hereby incorporated by reference in their entirety.

TECHNICAL FIELD

The present disclosure relates to an information processing apparatus, an information processing method, and a program.

BACKGROUND ART

In recent years, use of a virtual space which is a virtual world connected via the Internet has become widespread. A user can communicate with users around the world via a network by using a character (also referred to as an avatar) that is a virtual self in the virtual space. The avatar is expressed by, for example, two-dimensional or three-dimensional computer graphics (CG).

In relation to the use of the virtual space, for example, Patent Document 1 below discloses a technology of reflecting an action in a real world of a participant participating in communication or an object held in the hand in an avatar of the participant in the virtual space.

CITATION LIST

Patent Document

Patent Document 1: Japanese Patent Application Laid-Open No. 2009-140492

SUMMARY OF THE INVENTION

Problems to be Solved by the Invention

However, during a non-operation period in which the user is not performing an operation, an unnatural phenomenon such as the avatar (virtual object) disappears from the virtual space or the avatar does not move at all in the virtual space occurs, and there is a possibility that a sense of discomfort to the virtual space is given to another user.

Therefore, the present disclosure proposes an information processing apparatus, an information processing method, and a program capable of causing a virtual object associated with a user in a virtual space to perform a more natural behavior even in a case of non-operation by the user.

Solutions to Problems

The present disclosure proposes the information processing apparatus including a control unit that controls a behavior of a virtual object associated with a user in a virtual space in accordance with an operation of the user, in which the control unit performs control to generate the behavior of the virtual object on the basis of sensing data in a real space of the user and reflect the behavior in the virtual object during a non-operation period of the user.

The present disclosure proposes an information processing method including, by a processor, controlling a behavior of a virtual object associated with a user in a virtual space in accordance with an operation of the user, and furthermore, performing control to generate the behavior of the virtual object on the basis of sensing data in a real space of the user and reflect the behavior in the virtual object during a non-operation period of the user.

The present disclosure proposes a program that causes a computer to function as a control unit that controls a behavior of a virtual object associated with a user in a virtual space in accordance with an operation of the user, in which the control unit performs control to generate the behavior of the virtual object on the basis of sensing data in a real space of the user and reflect the behavior in the virtual object during a non-operation period of the user.

BRIEF DESCRIPTION OF DRAWINGS

FIG. 5 is a diagram illustrating an example of a database of an avatar behavior according to the present embodiment.

MODE FOR CARRYING OUT THE INVENTION

Figure 1:
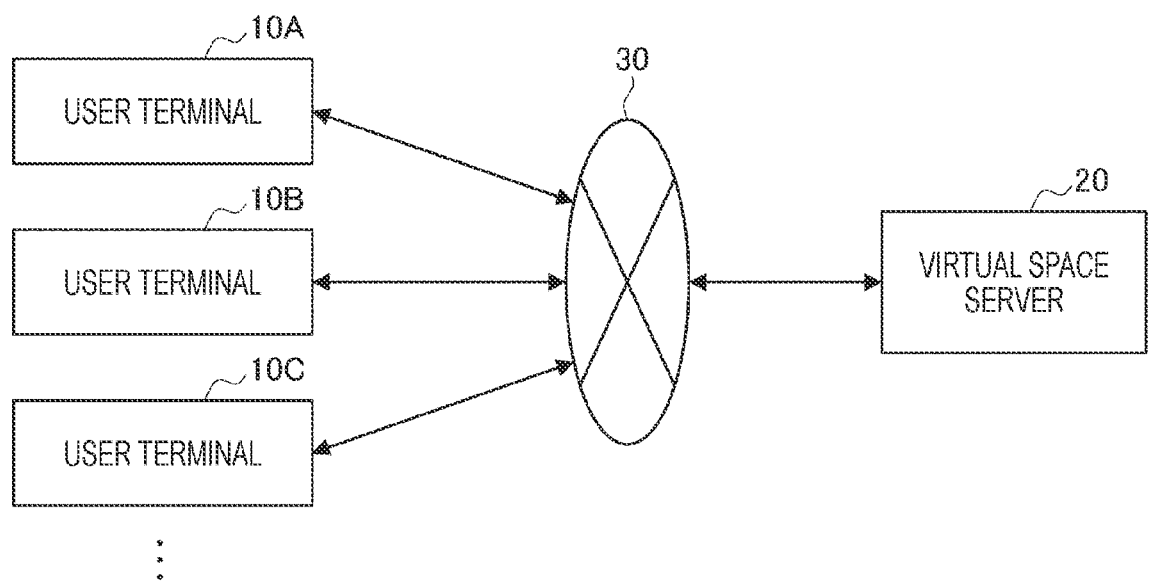
FIG. 1 is a diagram for describing an overview of an information processing system according to an embodiment of the present disclosure.

Hereinafter, a preferred embodiment of the present disclosure will be described in detail with reference to the accompanying drawings. Note that, in the present specification and drawings, components having substantially the same functional configuration are denoted by the same reference signs, and redundant description is omitted.

Furthermore, the description is given in the following order.

1. Overview of information processing system according to embodiment of present disclosure
2. Configuration example
2-1. Configuration example of user terminal 10
2-2. Configuration example of virtual space server 20
3. Action processing
4. Modifications
5. Additional notes

1. Overview of Information Processing System According to Embodiment of Present Disclosure An information processing system according to an embodiment of the present disclosure relates to control of a virtual object associated with a user in a virtual space and serving as a virtual self of the user. The virtual object serving as the virtual self of the user is, for example, a human figure or a character other than a human expressed by two-dimensional or three-dimensional CG, and is also referred to as a so-called avatar. In recent years, communication in a virtual space has become widespread, and not only simple communication such as a game and a conversation, but also various types of communication are performed, such as live distribution of an artist and business use such as transaction of content in a game of a 3D model or the like. Furthermore, there is also a trend in which various events such as trade shows that have been held in the real world are held by using an avatar in a virtual space without visiting the actual place, and attention is paid to the virtual space as a second living space next to a real space. Such a virtual world on the Internet obtained by virtualizing the real space is also referred to as a so-called metaverse.

FIG. 1 is a diagram for describing an overview of the information processing system according to an embodiment of the present disclosure. As illustrated in FIG. 1, the information processing system according to the present embodiment includes one or more user terminals 10 (10A, 10B, 10C . . . ) and a virtual space server 20 (an example of an information processing apparatus) that manages a virtual space.

The user terminal 10 is an information processing terminal used by the user. The user terminal 10 transmits information of operation input by the user and sensing data to the virtual space server 20. In addition, the user terminal 10 performs control to display a video from a user viewpoint in the virtual space received from the virtual space server 20. The user viewpoint may be a viewpoint of the avatar of the user in the virtual space, or may be a viewpoint of a field of view including an appearance of the avatar.

In addition, the user terminal 10 can be implemented by a smartphone, a tablet terminal, a personal computer (PC), a head mounted display (HMD) mounted on the head, a projector, a television device, a game console, or the like. The HMD may have a non-transmissive display unit that covers the entire field of view, or may have a transmissive display unit. Examples of the HMD having a non-transmissive display unit include an eyewear device having a so-called augmented reality (AR) display function of superimposing and displaying a virtual object in the real space. In addition, the HMD may be a device capable of arbitrarily switching the display unit between non-transmissive and transmissive.

For example, by using a non-transmissive HMD that covers the entire field of view as the user terminal 10, the user can experience the virtual space by virtual reality (VR). The display unit of the HMD includes a left-eye display and a right-eye display, and the user can stereoscopically view a video from the user viewpoint in the virtual space, and can obtain a sense of immersion in the virtual space more realistically.

The virtual space server 20 is an information processing apparatus that generates and controls the virtual space, generates and distributes a video from an arbitrary viewpoint in the virtual space, and the like. The virtual space server 20 may be implemented by a single apparatus or may be implemented by a system including a plurality of servers. Various 2D or 3D virtual objects are disposed in the virtual space. An example of the virtual object is an avatar of each user. The virtual space server 20 can control the avatar of each user in real time on the basis of the information received from each user terminal 10. Each user can view a video of the user viewpoint (for example, a viewpoint of a user avatar) in the virtual space with the user terminal 10 and communicate with another user via the avatar. In addition, the virtual space server 20 can also perform control to transmit the voice (speech voice of the user) received from the user terminal 10 to the opposite-side user terminal 10 corresponding to the other user avatar present near the user avatar. This control enables voice conversation between the avatars in the virtual space. The conversation between the avatars is not limited to a voice, and may be performed by text.

(Review of Problems)

The avatar (virtual object) disposed in the virtual space is operated in real time by the user. When the avatar is not controlled, such as in a case where the user logs out or stops operating, the avatar suddenly disappears from the virtual space or does not move at all. When such a phenomenon that could be unnatural in the real space occurs, there is a possibility that the phenomenon gives another user a sense of discomfort to the virtual space. In particular, in the case of the metaverse used as the second living space, an unnatural state in which the avatar suddenly disappears or does not move at all is not preferable.

Therefore, even in a case of non-operation by the user, the information processing system of the present disclosure enables the avatar, which is a virtual object associated with the user in the virtual space, to perform a more natural behavior.

That is, the virtual space server 20 avoids an unnatural state by causing the avatar to perform an autonomous behavior during the non-operation period of the user. However, uniform behavior control with a simple autopilot is insufficient as a more natural behavior expression of the avatar. On the other hand, in the present embodiment, control is performed to generate a behavior of the avatar associated with the user on the basis of the sensing data of the user in the real space and reflect the generated behavior in the behavior of the avatar during the non-operation period. As a result, more natural autonomous behavior of the avatar is achieved, and the behavior of the user in the real space is reflected in the avatar of the user. Therefore, it is possible to reduce the user's sense of discomfort toward the autonomous behavior of the avatar of the user in the virtual space as compared with the user's own state in the real space.

Figure 2:
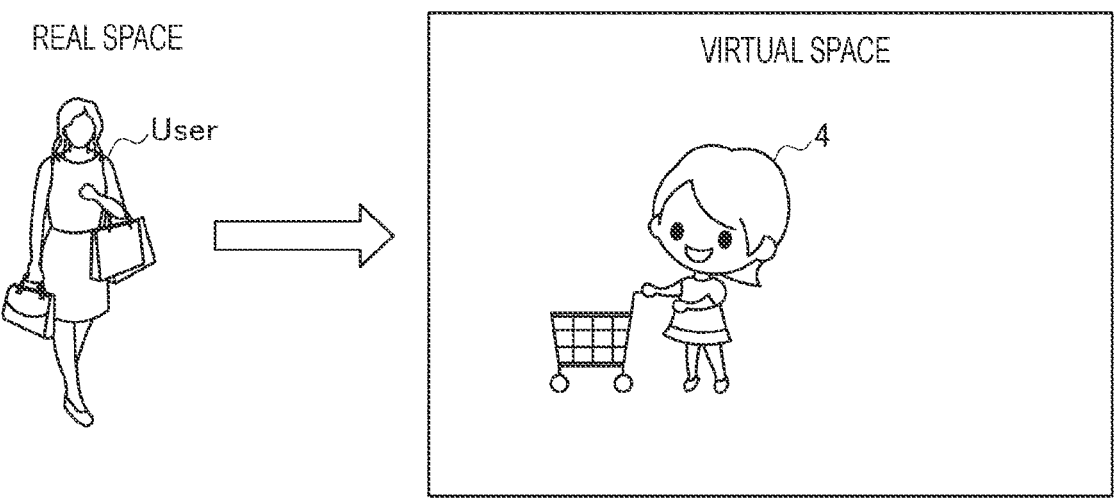
FIG. 2 is a diagram for describing sensing data of a user in a real space is reflected on a behavior of an avatar of a user in a virtual space according to the present embodiment.

FIG. 2 is a diagram for describing the sensing data of the user in the real space is reflected on the behavior of an avatar 4 of the user in the virtual space according to the present embodiment. As illustrated in FIG. 2, for example, the state of the user when the user is shopping in the real space is sensed by various sensors, and sensing data is transmitted from the user terminal 10 to the virtual space server 20 and is reflected in the behavior of the avatar 4 in the virtual space. For example, the virtual space server 20 generates a "shopping behavior" from the sensing data and reflects the generated "shopping behavior" on the behavior of the avatar 4. Specifically, the virtual space server 20 controls the behavior of the avatar 4 so as to purchase a predetermined product at a predetermined store in the virtual space. The product to be purchased may be a product that the user has put in a purchase schedule/wish list in advance, or may be appropriately determined on the basis of a preference of the user, a behavior history in the virtual space, a task, and the like. Alternatively, as described later, a predetermined item may be allowed to be purchased free of charge as a reward from a service side for the autonomous behavior. In addition, the shopping behavior may be a behavior in which an avatar does not make an actual purchase, such as entering or leaving a store in the virtual space or window-shopping around a large number of stores.

In this way, even during the non-operation period of the user, the avatar in the virtual space autonomously executes a natural behavior, and a sense of discomfort of another user is reduced. Furthermore, since the user's own behavior in the real space is reflected in the avatar of the user, the sense of discomfort to the autonomous behavior of the avatar is reduced.

The information processing system according to an embodiment of the present disclosure has been described above. Subsequently, a configuration of each device included in the information processing system according to the present embodiment will be described with reference to the drawings.

2. Configuration Examples

2-1. Configuration Example of User Terminal 10

Figure 3:
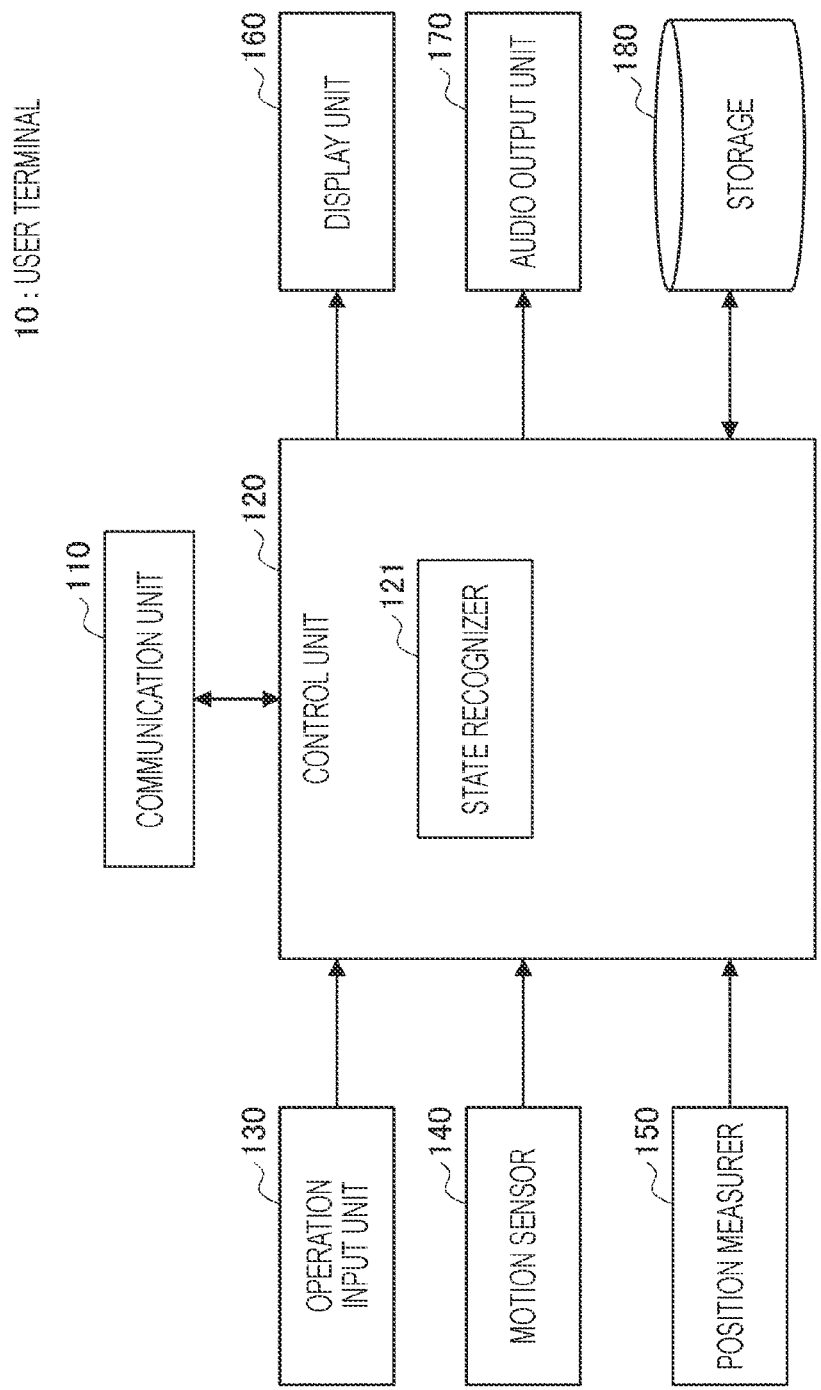
FIG. 3 is a block diagram illustrating an example of a configuration of a user terminal according to the present embodiment.

FIG. 3 is a block diagram illustrating an example of a configuration of the user terminal 10 according to the present embodiment. As illustrated in FIG. 3, the user terminal 10 includes a communication unit 110, a control unit 120, an operation input unit 130, a motion sensor 140, a position measurer 150, a display unit 160, an audio output unit 170, and a storage 180. The user terminal 10 may be implemented by, for example, a transmissive or non-transmissive HMD, a smartphone, a tablet terminal, or a wearable device such as a smart watch or a smart band.

(Communication Unit 110)

The communication unit 110 is communicably connected to the virtual space server 20 in a wired or wireless manner to transmit and receive data. The communication unit 110 can perform communication using, for example, a wired/wireless local area network LAN, a Wi-Fi (registered trademark), a Bluetooth (registered trademark), infrared communication, a mobile communication network (fourth-generation mobile communication system (4G), fifth-generation mobile communication system (5G)), or the like.

(Control Unit 120)

The control unit 120 functions as a computation processing device and a control device, and controls the overall action in the user terminal 10 in accordance with various programs. The control unit 120 is implemented by, for example, an electronic circuit such as a central processing unit (CPU) or a microprocessor. In addition, the control unit 120 may include a read only memory (ROM) that memorizes programs, computation parameters, and the like to be used, and a random access memory (RAM) that temporarily memorizes parameters and the like that change appropriately.

The control unit 120 according to the present embodiment performs control to display, on the display unit 160, the video from the user viewpoint in the virtual space transmitted (for example, distributed by streaming) from the virtual space server 20. In addition, the control unit 120 also performs control to reproduce, from the audio output unit 170, an audio signal transmitted together with the video from the user viewpoint described above from the virtual space server 20. Furthermore, the control unit 120 performs control to transmit information acquired by the operation input unit 130, the motion sensor 140, and the position measurer 150 from the communication unit 110 to the virtual space server 20. For example, various operation information is input from the operation input unit 130 and transmitted to the virtual space server 20 as input information of a user operation to the virtual space. In addition, the motion data acquired by the motion sensor 140 can be transmitted to the virtual space server 20 as information for controlling a position and posture (face orientation and the like) of the avatar. Note that, here, as an example, it is assumed that a device with which the user views the video of the virtual space (device used for the operation of the avatar) and a device that transmits, to the virtual space server 20, the sensing data of the real space of the user used to generate the autonomous behavior of the avatar during the non-operation period of the avatar are the same device. However, these devices may be different devices.

Furthermore, the control unit 120 according to the present embodiment also functions as a state recognizer 121. The state recognizer 121 recognizes a state of the user on the basis of the sensing data of the user acquired by the motion sensor 140. The state of the user is, for example, walking, running, standing, sitting, sleeping, or the like. The state of the user recognized by the state recognizer 121 is transmitted to the virtual space server 20 by the control unit 120, and is used when the autonomous behavior of the avatar is generated by the virtual space server 20. In addition, position information acquired by the position measurer 150 is also used when the autonomous behavior of the avatar is generated by the virtual space server 20. When transmitting the state of the user, the control unit 120 may also transmit the position information to the virtual space server 20, or may transmit the position information when detecting a change (movement) in position. In addition, the control unit 120 may transmit the state and the position information of the user to the virtual space server 20 during the non-operation period in which the user is not operating the avatar in the virtual space. Furthermore, the control unit 120 may combine the position information and map information, specify the name of a location where the user is, and transmit the name to the virtual space server 20. The name of the location may be a general name. For example, in a case where it is specified that the user is in "XX Park in XX City", only notification of "park" may be provided. This notification can protect the privacy of the user. The map information can be memorized in advance in the storage 180. In addition, the map information is not limited to outdoor map information, and includes indoor map information of inside a school, a company, a department store, home, and the like. The control unit 120 can also specify, from the position information, in which room the user is in, such as a bedroom or a living room at home.

Note that the control unit 120 may use the sensing data (captured image, motion data) of the user acquired by an external sensor (for example, a camera installed around the user, a motion sensor attached to the user separately from the user terminal 10, or the like.) acquired from the communication unit 110 for recognizing the state of the user and specifying the location, or may transmit the sensing data as it is to the virtual space server 20. In addition, the control unit 120 may transmit the operation information received from a controller held by the user to the virtual space server 20.

(Operation Input Unit 130)

The operation input unit 130 receives an operation instruction by the user to output the content of the operation to the control unit 120. The operation input unit 130 may be, for example, a touch sensor, a pressure sensor, or a proximity sensor. Alternatively, the operation input unit 130 may have a physical configuration such as a button, a switch, and a lever.

(Motion Sensor 140)

The motion sensor 140 has a function of sensing a motion of the user. Specifically, the motion sensor 140 may include an acceleration sensor, an angular velocity sensor, and a geomagnetic sensor. Furthermore, the motion sensor 140 may be a sensor capable of detecting a total of nine axes including a three-axis gyro sensor, a three-axis acceleration sensor, and a three-axis geomagnetic sensor. Examples of the motion of the user include a motion of the user's body and a motion of the user's head. Specifically, the motion sensor 140 senses a motion of the user terminal 10 worn by the user as the motion of the user. For example, in a case where the user terminal 10 includes an HMD and is worn on the head, the motion sensor 140 can sense the motion of the head of the user. In addition, for example, in a case where the user terminal 10 includes a smartphone and the user goes out in a state of being in a pocket or a bag, the motion sensor 140 can sense the motion of the user's body. Furthermore, the motion sensor 140 may be a wearable device that is configured separately from the user terminal 10 and worn by the user.

(Position Measurer 150)

The position measurer 150 has a function of acquiring a current position of the user. In the present embodiment, it is assumed that the user is carrying the user terminal 10, and the position of the user terminal 10 is regarded as the current position of the user.

Specifically, the position measurer 150 calculates an absolute or relative position of the user terminal 10. For example, the position measurer 150 may measure the current position on the basis of an acquired signal from the outside. For example, a global navigation satellite system (GNSS) that receives radio waves from an artificial satellite and detects the position where the user terminal 10 exists may be used. Furthermore, in addition to GNSS, Wi-Fi (registered trademark), Bluetooth (registered trademark), transmission and reception with a mobile phone, a PHS, a smartphone, or the like, and a method of detecting a position by short-range communication or the like may be used. In addition, the position measurer 150 may estimate information indicating a relative change on the basis of a detection result of the acceleration sensor, the angular velocity sensor, or the like. The position measurer 150 can perform outdoor position measurement and indoor position measurement by the various methods described above. Note that the position may include altitude. The position measurer 150 may include an altimeter.

(Display Unit 160)

The display unit 160 has a function of displaying a video (image) from the user viewpoint in the virtual space. For example, the display unit 160 may be a display panel such as a liquid crystal display (LCD) or an organic electro luminescence (EL) display.

(Audio Output Unit 170)

The audio output unit 170 outputs an audio signal under the control of the control unit 120. The audio output unit 170 may be configured as a headphone, an earphone, or a bone conduction speaker, for example.

(Storage 180)

The storage 180 is implemented by a read only memory (ROM) that memorizes programs, computation parameters, and the like used for processing of the control unit 120, and a random access memory (RAM) that temporarily memorizes parameters and the like that change appropriately. The storage 180 according to the present embodiment may store, for example, an algorithm for recognizing the state.

The configuration of the user terminal 10 has been described in detail, but the configuration of the user terminal 10 of the present disclosure is not limited to the example illustrated in FIG. 3.

For example, the user terminal 10 may be implemented by a plurality of devices. Specifically, the motion sensor 140 and the position measurer 150 may be configured separately from the control unit 120.

In addition, the user terminal 10 may further include various sensors. For example, the user terminal 10 may include a camera, a microphone, a biometric sensor (detector such as pulse, heart rate, sweating, blood pressure, body temperature, respiration, myoelectric value, and brain wave), a line-of-sight detection sensor, a distance measurement sensor, and the like, and transmit the acquired information to the virtual space server 20. In addition, the state recognizer 121 may recognize the state of the user (running, walking, sleeping, and the like) in consideration of not only the motion data but also, for example, biometric data acquired by a biometric sensor. Furthermore, the control unit 120 may analyze a captured image around the user acquired by the camera and specify the position of the user (the name of a location where the user is).

2-2. Configuration Example of Virtual Space Server 20

Figure 4:
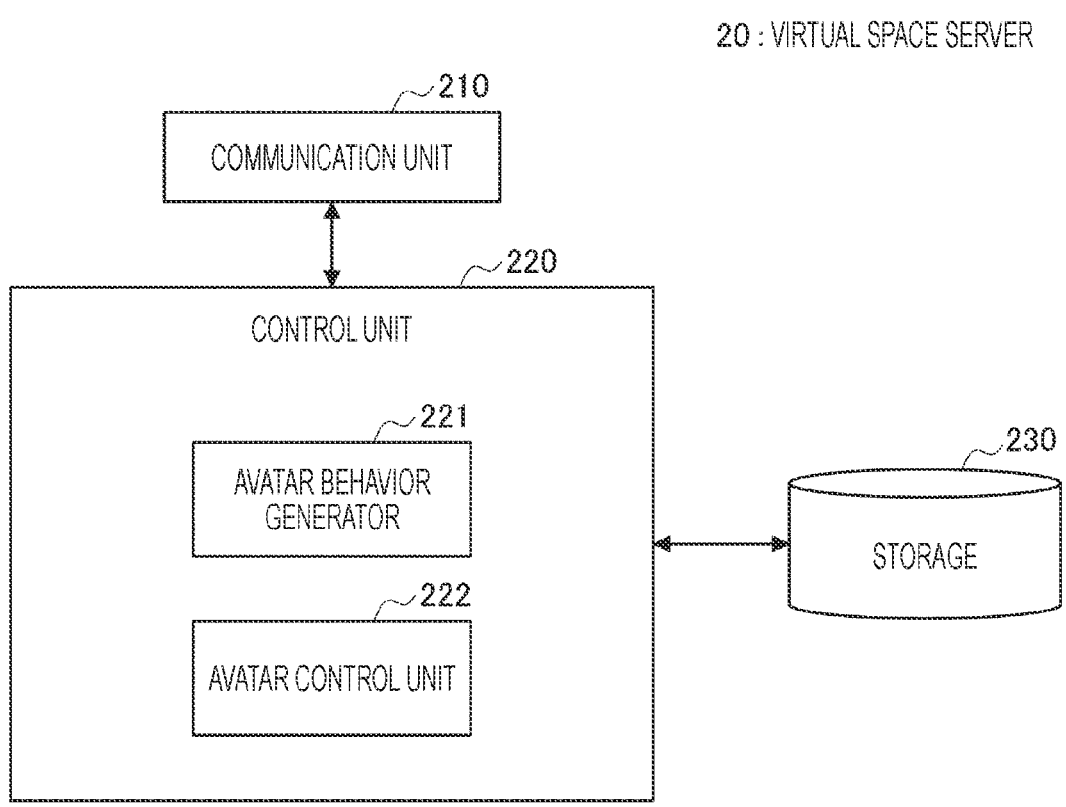
FIG. 4 is a block diagram illustrating an example of a configuration of a management server according to the present embodiment.

FIG. 4 is a block diagram illustrating an example of a configuration of the virtual space server 20 according to the present embodiment. As illustrated in FIG. 4, the virtual space server 20 includes a communication unit 210, a control unit 220, and a storage 230.

(Communication Unit 210)

The communication unit 210 transmits and receives data to and from an external device in a wired or wireless manner. The communication unit 210 is communicably connected to the user terminal 10 by using, for example, a wired/wireless local area network (LAN), Wi-Fi (registered trademark), Bluetooth (registered trademark), a mobile communication network (long term evolution (LTE), a fourth generation mobile communication system (4G), a fifth generation mobile communication system (5G), or the like.

(Control Unit 220)

The control unit 220 functions as a computation processing device and a control device, and controls the overall action in the virtual space server 20 in accordance with various programs. The control unit 220 is implemented by, for example, an electronic circuit such as a central processing unit (CPU) or a microprocessor. In addition, the control unit 220 may include a read only memory (ROM) that memorizes programs, computation parameters, and the like to be used, and a random access memory (RAM) that temporarily stores parameters and the like that change appropriately.

Furthermore, the control unit 220 according to the present embodiment also functions as an avatar behavior generator 221 and an avatar control unit 222.

The avatar behavior generator 221 has a function of generating the autonomous behavior of the avatar on the basis of the sensing data of the user in the real space during the non-operation period. In addition, the avatar control unit 222 has a function of controlling the avatar of the user in accordance with the autonomous behavior generated by the avatar behavior generator 221. This function can avoid an unnatural situation in which the avatar suddenly disappears from the virtual space or does not move at all even during the non-operation period. In addition, the sensing data of the user is, for example, at least one of the state or the position information of the user. The sensing data can be transmitted from the user terminal 10. Note that, from the user terminal 10, the information detected by the motion sensor 140 or the position measurer 150 may be transmitted as it is, or a recognition result recognized on the basis of the information may be transmitted. The state of the user can be recognized from the motion data as described above. Such recognition may be performed by the user terminal 10 or may be performed by the control unit 220 of the virtual space server 20. The position information may be a name of a location. In the present embodiment, by reflecting the state and the position information of the user in the real space in the autonomous behavior of the avatar, it is possible to reduce the sense of discomfort of the user to the autonomous behavior of the avatar during the non-operation period. The sense of discomfort of the user is, for example, a sense of discomfort that may occur in a familiar virtual space called a metaverse in a case where the avatar of the user is performing an arbitrary behavior regardless of the actual behavior of the user.

Hereinafter, the generation of an avatar behavior according to the present embodiment will be described in detail.

The avatar behavior generator 221 may generate the autonomous behavior of the avatar by referring to a database of the avatar behavior from, for example, the state of the user or the position information obtained by sensing the user. An example of the database of the avatar behavior is illustrated in FIG. 5. As illustrated in FIG. 5, a database in which the avatar behavior is associated with the state and the position of the user in advance is used. It can be said that the state and the position (location) are factors that constitute the avatar behavior. For example, in the example illustrated in FIG. 5, a behavior of "meal" includes factors of a state of "sit down" and a position (location) of "living room at home" or "restaurant". The factor constituting each avatar behavior is desirably a factor in a user behavior that matches the avatar behavior. For example, as illustrated in FIG. 5, examples of the factor of an avatar behavior of "sleep" include "state: sleep" and "position: bedroom" constituting the matching user behavior of "sleep". Note that the avatar behavior defined here is a behavior that the avatar can perform in the virtual space. The correspondence relationship between the avatar behavior and each factor such as the state and the position illustrated in FIG. 5 is an example, and the present embodiment is not limited thereto.

First, the avatar behavior generator 221 matches the state of the user and the position information acquired from the user terminal 10 with the database of the avatar behavior, and calculates a matching rate. For example, in a case where the information acquired from the user terminal 10 is "state: walk" and "position: shop", the matching rate with "shopping" among the avatar behaviors listed in the database of FIG. 5 is calculated to be 100%, and the matching rate with "defeat the enemy" is calculated to be 50%. The calculation is due to satisfaction of a state factor of a state factor or a position factor of "defeat the enemy". In this case, the avatar behavior generator 221 may determine, as the autonomous behavior of the avatar, an avatar behavior (here, "shopping") that is completely corresponding (having a matching rate of 100%). In addition, in a case where there is no completely corresponding avatar behavior, the avatar behavior generator 221 may stochastically determine the avatar behavior from candidates for the avatar behavior including at least one of the corresponding state factor or position factor. At this time, the avatar behavior generator 221 can determine a natural autonomous behavior with less sense of discomfort to the user behavior in the real space by increasing a selection probability of a candidate including more matching factors. Note that, even in a case where there is a completely corresponding avatar behavior (with a matching rate of 100%), the avatar behavior generator 221 may stochastically determine the avatar behavior from the candidates for the avatar behavior including at least one of the corresponding state factor or position factor.

In the method using the database in which the state factor, the position factor, and the avatar behavior are associated with each other described above, a behavior that is not performed in the real space but is performed in the virtual space can also be generated as an autonomous behavior. As an example, there is an avatar behavior of "defeat the enemy" listed in the database in FIG. 5. This behavior is a behavior that frequently occurs in a virtual space having a purpose of defeating the enemy, but there is no behavior that directly corresponds in the real space. Therefore, in the present embodiment, for example, "avatar behavior: defeat the enemy" is configured by factors such as "state: walk/stand" and "position: street". As a result, even a behavior not performed in the real space but performed only in the virtual space can be selected as the autonomous behavior of the avatar on the basis of the sensing data of the user in the real space.

In addition, in the example illustrated in FIG. 5, there is no candidate for the avatar behavior configured by the completely same factor, but a plurality of avatar behaviors having the completely same factor may be defined. At this time, the avatar behavior generator 221 probabilistically selects one from a plurality of candidates for the completely corresponding avatar behavior (with a matching rate of 100%).

In addition, a category of the state and a category of the position illustrated in FIG. 5 are examples, and the present embodiment is not limited thereto. As these categories become more diverse, it becomes possible to more appropriately reflect the behavior of the user in the real space in the avatar behavior. Furthermore, as for the candidates for the avatar behavior, it is possible to generate a more appropriate and natural autonomous behavior by preparing more diverse candidates in which the state and position factors are exhaustively configured.

The database of the avatar behavior according to the present embodiment can be reused in a virtual space of a plurality of different services. That is, the database as illustrated in FIG. 5 may be used at a time of generation of the autonomous behavior of the avatar during the non-operation period of the user in another virtual space. The information of the database can be shared by cooperation between virtual spaces. In addition, in a case where there is an inappropriate autonomous behavior or an insufficient autonomous behavior in each virtual space, it is possible to create a database suitable for each virtual space by appropriately correcting, changing, and adding the defined avatar behavior in each virtual space. For example, the avatar behavior "defeat the enemy" is changed to "cultivate the field" or the like while the constituent factors are maintained. Note that the avatar of the user can move to another virtual space by cooperation between the virtual spaces. In addition, a case where the avatar of the user exists in each virtual space (in each service) is also assumed. As an example, the user terminal 10 may transmit the sensing data of the user to the plurality of virtual space servers 20. This transmission makes it possible to reflect the user behavior in the real space in the autonomous behavior of the avatar of the user with reference to the database in each of the plurality of virtual spaces.

As described above, in the present embodiment, the method of determining (generating) the autonomous behavior of the avatar by using a factor has been described as an example. However, the method is not limited as long as the sensing data of the user in the real space can be converted into a behavior format applicable to the avatar of the user in the virtual space. For example, if there is a virtual space that can accurately reflect the state and position of the user in the real space, the detected information as it is may be applied to the avatar in the virtual space. In addition, the "sensing data of the user" reflected on the avatar is not limited to the state or position. Furthermore, the "state" is not limited to a state recognized on the basis of the motion data. For example, the state may be recognized on the basis of a speech voice (conversation) of the user collected by a microphone of the user terminal 10 or biometric information (heart rate, blood pressure, body temperature, or the like).

(Storage 230)

The storage 230 is implemented by a read only memory (ROM) that memorizes programs, computation parameters, and the like used for processing of the control unit 220, and a random access memory (RAM) that temporarily memorizes parameters and the like that change appropriately. In the present embodiment, the storage 230 stores information of the virtual space.

The configuration of the virtual space server 20 has been described specifically, but the configuration of the virtual space server 20 of the present disclosure is not limited to the example illustrated in FIG. 4. For example, the virtual space server 20 may be implemented by a plurality of apparatuses.

3. Action Processing

Figure 6:
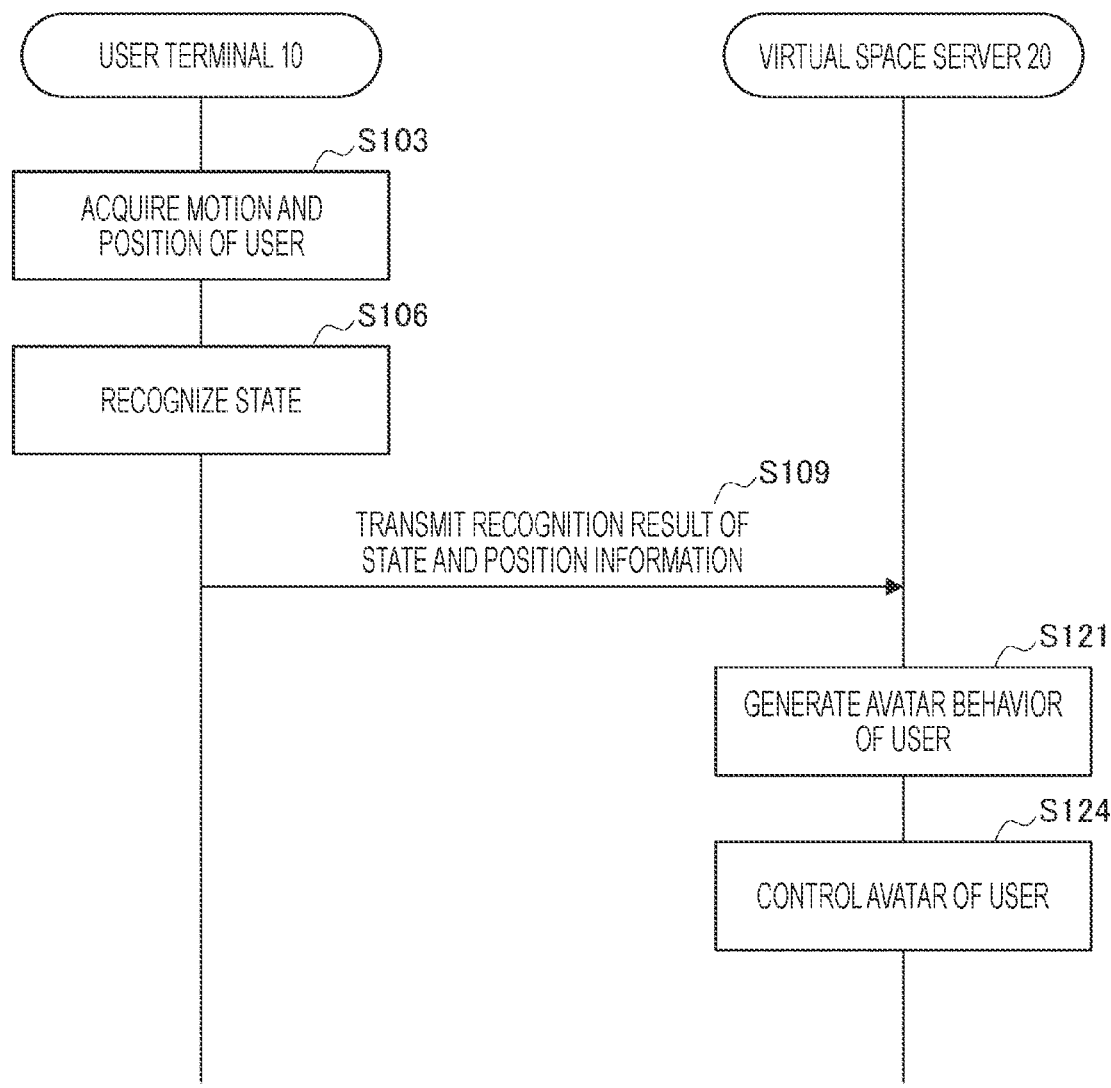
FIG. 6 is a sequence diagram illustrating an example of a flow of action processing according to the present embodiment.

Next, a flow of processing of the virtual object according to the present embodiment will be specifically described with reference to the drawings. FIG. 6 is a sequence diagram illustrating an example of a flow of action processing according to the present embodiment. Note that the processing illustrated in FIG. 6 can be performed during the non-operation period in which the user is not operating the avatar (for example, in a case where the user has logged out, in a case where a screen displaying the video of the virtual space has been closed, in a case where the user has not performed the operation for a certain period of time or more, or the like).

As illustrated in FIG. 6, first, the user terminal 10 acquires the motion and position of the user by each sensor (step S103). Specifically, the motion of the user is acquired by the motion sensor 140, and the position information is acquired by the position measurer 150.

Next, the state recognizer 121 of the user terminal 10 recognizes the state of the user on the basis of the motion (motion data) of the user (step S106).

Then, the user terminal 10 transmits the position information (which may be a general name of a location) and a recognition result of the state (step S109).

Subsequently, the virtual space server 20 generates the avatar behavior of the user on the basis of the position information and the recognition result of the state received from the user terminal 10 (step S121). Note that the avatar behavior generator 221 of the virtual space server 20 may generate the avatar behavior on the basis of at least one of the position information or the recognition result of the state.

Then, the avatar control unit 222 of the virtual space server 20 applies the avatar behavior generated (selected) by the avatar behavior generator 221 to the avatar of the user and controls the avatar behavior (step S124). As a result, even during the non-operation period of the user, the avatar of the user can be caused to perform an autonomous behavior, and unnaturalness can be reduced. In addition, by reflecting the behavior of the user in the real space in the autonomous behavior of the avatar, it is possible to reduce the sense of discomfort and reluctance of the user of the own avatar.

Furthermore, the motion and position of the user are acquired by the user terminal 10 (or a wearable device worn by the user) carried by the user, and thus, the restriction of a measurement range is relaxed.

An example of the action processing according to the present embodiment has been described above. Note that the action processing illustrated in FIG. 6 is an example, and some processing may be performed in different orders or in parallel.

4. Modifications 4-1. Generation of Avatar Behavior in Consideration of Privacy

In the embodiment described above, the state and position of the user in the real space can be reflected in the avatar behavior. However, in the virtual space, since communication with an unspecified number of other users is performed, consideration of privacy is also important. In the embodiment described above, although the specific current position of the user is not known, it is also assumed that the autonomous behavior of the avatar is required to be generated in more strict consideration of privacy depending on the situation.

Therefore, for example, the virtual space server 20 may set a privacy level in advance for each behavior defined as the autonomous behavior of the avatar, and show (display) the behavior to a level permitted in accordance with familiarity between the user and the other user. Table 1 below is an example of the privacy level set for the autonomous behavior of the avatar.

TABLE 1

| Avatar behavior (autonomous behavior) | Privacy level |
| --- | --- |
| Sleep | Level 1 |
| Work, meal | Level 2 |
| Shopping | Level 3 |

In Table 1, a higher privacy level is set for "shopping" with high privacy involving going out. The privacy level may be arbitrarily set by the user.

In addition, the user determines to which level the behavior expression of the avatar is permitted (shown) to the other users in the virtual space. Such permission may be individually set for each of the other users, or may be set for each group by grouping the other users in advance. For example, the user having a close relationship may be permitted up to the highest privacy level (for example, level 3), and the other users having no close relationship may be permitted up to the lowest privacy level (for example, level 0). In a case where there is no behavior corresponding to the candidate for the autonomous behavior of the avatar due to a restriction by the privacy level, the avatar behavior generator 221 can select a general behavior. The general behavior is, for example, a behavior randomly selected from the candidates for the autonomous behavior defined in the database of the avatar behavior. Alternatively, the behavior may be a behavior randomly selected from a large number of candidates for the autonomous behavior prepared as a general behavior.

Figure 7:
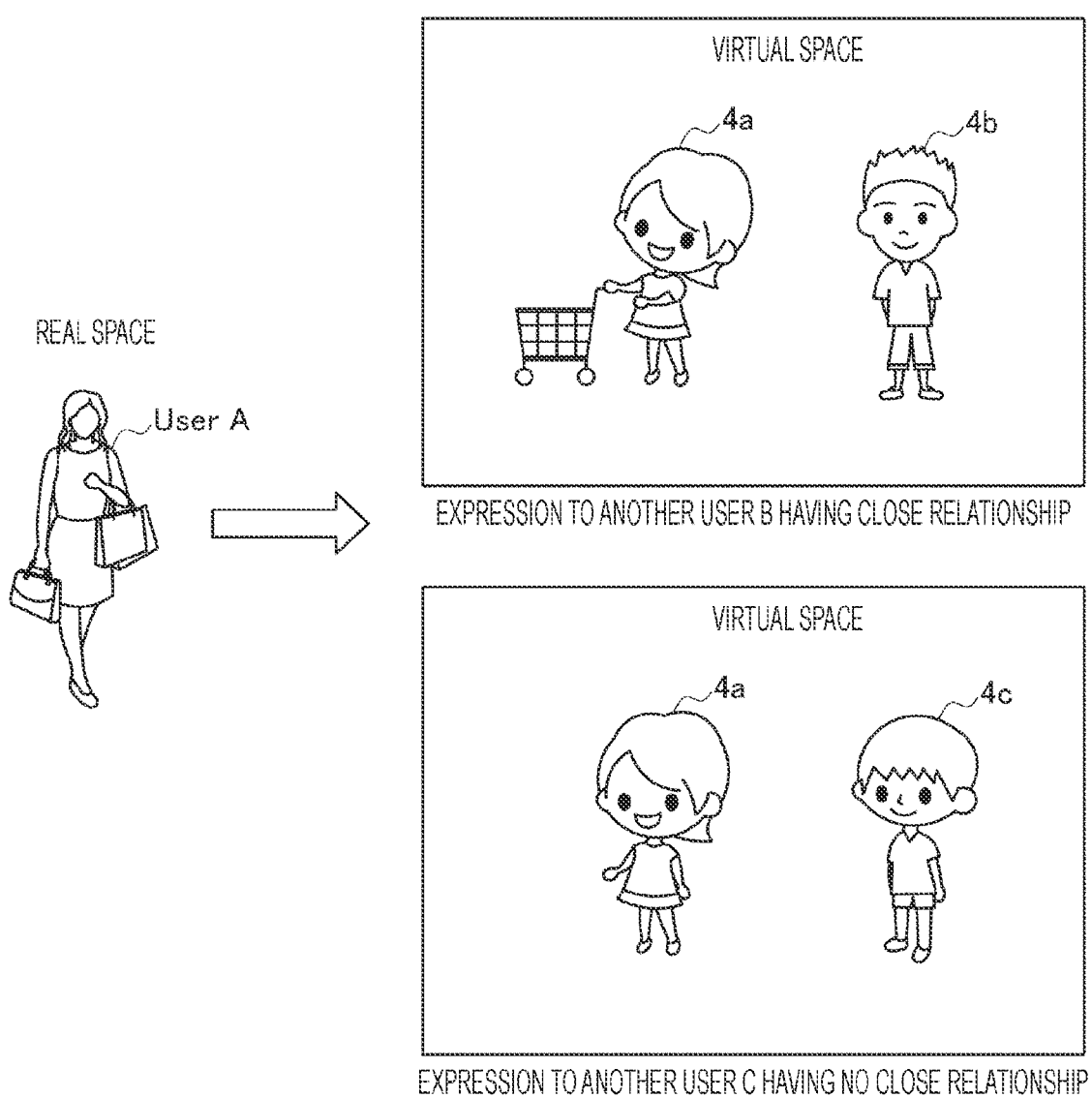
FIG. 7 is a diagram for describing an example of expression of an autonomous behavior of an avatar restricted in accordance with a privacy level according to the present embodiment.

FIG. 7 is a diagram for describing an example of expression of the autonomous behavior of the avatar restricted in accordance with the privacy level according to the present embodiment. For example, it is assumed that a user B (avatar 4b) having a close relationship with a user A is permitted up to a privacy level 3, and a user C (avatar 4c) having no close relationship is permitted up to a privacy level 0. The virtual space server 20 refers to the database illustrated in FIG. 5 on the basis of data (state: walk, location: shop) sensed from the user in the real space, and determines the autonomous behavior of "shopping" for an avatar 4a of the user. Next, as illustrated in Table 1, since the privacy level of "shopping" is "level 3", a state in which the avatar 4a is "shopping" is shown to the user B who is permitted up to the privacy level 3. On the other hand, since the user C is not permitted up to the privacy level (level 3) of the behavior of "shopping", the general behavior (for example, simply taking a walk, staying at home, or the like) of the avatar 4a is shown to the user C who is permitted up to the privacy level 0.

Specifically, the virtual space server 20 controls how to display the autonomous behavior of the avatar 4a in accordance with the privacy level when generating the video from each user viewpoint to be transmitted to the user terminal of the user B or the user C.

(General Behavior)

Figure 8:
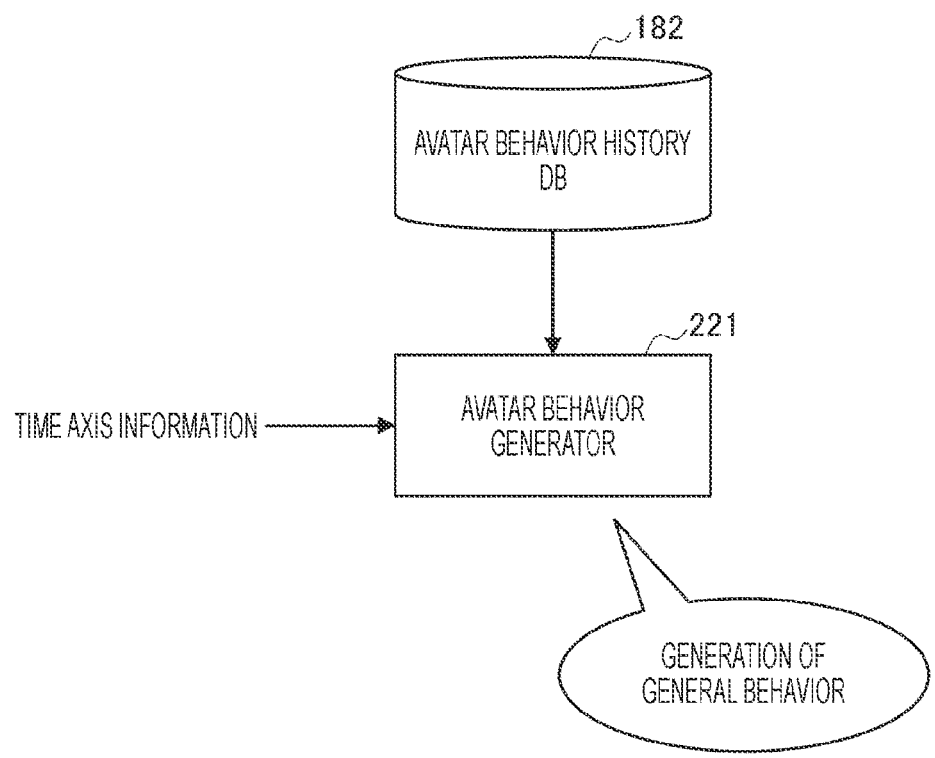
FIG. 8 is a configuration diagram for describing generation of a general behavior according to a modification of the present embodiment.

The general behavior described above may be a selection method based on learning using the behavior history of each avatar in the virtual space, in addition to the random selection method. FIG. 8 is a configuration diagram for describing generation of the general behavior according to a modification of the present embodiment. An avatar behavior history DB182 illustrated in FIG. 8 is a database that accumulates a history (including time axis information) of behavior of all avatars in the virtual space. The information accumulated in the avatar behavior history DB182 may be, for example, an autonomous behavior of the avatar reflecting the behavior of the user in the real space. When generating the general behavior, the avatar behavior generator 221 refers to current time axis information and the avatar behavior history DB182, and acquires ratio information of the autonomous behavior of each avatar at a corresponding time. Then, the avatar behavior generator 221 determines a behavior with a higher ratio as the general behavior (stochastically selects the behavior on the basis of the ratio information). As a result, it is possible to cause the avatar to perform the same behavior as the behavior performed by a majority of avatars, and it is possible to protect the privacy of the user more naturally and inconspicuously.

In addition, as another method of selecting the general behavior, it is also possible to use matching with the database of the user behavior described with reference to FIG. 5. In the above example, the matching rate between the sensing data (state, position) of the user in the real space and each candidate for the avatar behavior in the database is calculated to stochastically determine the autonomous behavior. However, by adjusting a threshold value of the matching rate at the time of determining the autonomous behavior or adding noise at the time of calculating the matching rate, it is possible to select an appropriate autonomous behavior while protecting privacy. Note that a strength of privacy protection can also be adjusted by adjusting the threshold value or adjusting an intensity of noise.

Each user may arbitrarily select whether to cause the avatar to perform autonomous behavior almost equivalent to the autonomous behavior of the user in the real space, to perform the general behavior completely in consideration of privacy, or to perform a behavior utilizing both of the above characteristics.

As described above, in this modification, it is possible to protect privacy in an available space in which communication with an unspecified number of users in the world can be performed. Furthermore, a privacy level to be permitted can be set for each user.

4-2. Reward to User Who Uses Autonomous Behavior in Virtual Space

The virtual space server 20 may set a reward for the autonomous behavior of the avatar. Examples of the reward include acquisition of an item that can be used in the virtual space in the case of shopping behavior, acquisition of an experience value, currency, or the like in the virtual space in the case of behaviors of working and defeating an enemy, and recovery of physical strength used in the virtual space in the case of a behavior at home. Furthermore, in a case where the avatar moves in the virtual space by the autonomous behavior, the reward may be a reward for recording movement information and the video from the avatar viewpoint and checking the video or the like when the operation by the user is resumed.

Such rewards can promote an increase in the number of users who use autonomous behavior control.

4-3. Generation of General Behavior in Consideration of Time Zone Information Unlike the real space, the virtual space is less affected by a distance between users, and enables the user to easily communicate with users around the world. However, in a case where the behavior of the user in the real space is reflected in the autonomous behavior of the avatar, the avatar behaviors having no uniformity by the users in different time zones coexist. Therefore, the avatar behavior generator 221 of the virtual space server 20 controls the expression of the autonomous behavior of the avatar in accordance with the time zone of the viewing user, and can reduce unnaturalness due to a difference in the time zone.

Specifically, first, the virtual space server 20 prepares an avatar behavior history DB (including time axis information) for each time zone. Next, for example, for the user A (viewing user) in a time zone that is a night time zone, when the general behavior of the (non-operated) another user avatar that is visible to the user A is generated, a behavior suitable for the time zone of the user A (for example, "sleep") is extracted from the avatar behavior history DB.

4-4. Method of Reflecting Information of Real Space in Appearance of Avatar

The virtual space server 20 may reflect the information of the user in the real space on the appearance of the avatar. For example, the appearance of the avatar may be associated with each candidate for the avatar behavior as described with reference to FIG. 5. For example, pajamas are associated with "sleep", and suits or the like are associated with "work". When controlling the autonomous behavior of the avatar, the avatar control unit 222 of the virtual space server 20 can also appropriately change the appearance of the avatar. Since each behavior corresponds to an appearance, the appearance can be changed similarly when a behavior is generated (general behavior is generated) in the case of privacy protection described above.

5. Additional Notes

The preferred embodiment of the present disclosure has been described above in detail with reference to the accompanying drawings, but the present technology is not limited to such examples. It is obvious that those with ordinary skill in the technical field of the present disclosure can conceive various alterations or corrections within the scope of the technical idea recited in the claims, and it is naturally understood that these alterations or corrections also fall within the technical scope of the present disclosure.

Note that, in the present embodiment, a case will be described as an example where a video image from the user viewpoint is distributed (specifically, for example, distributed by streaming) from the virtual space server 20 to the user terminal 10. However, the system that implements communication via the virtual space according to the present embodiment is not limited this case. For example, each user terminal 10 may generate a virtual space and generate and display a video image from the user viewpoint in the virtual space. The information for generating the virtual space is acquired in advance from the virtual space server 20. In this case, each user terminal 10 transmits information of operation input by the user, sensing data, and the like to the virtual space server 20 in real time. Next, the virtual space server 20 performs control to transmit the information regarding the motion of the user avatar or the like received from the user terminal 10 to another user terminal 10. The virtual space server 20 also transmits information of autonomous control of the avatar as necessary.

In addition, it is also possible to create one or more computer programs for causing hardware such as a CPU, a ROM, and a RAM built in the virtual space server 20 described above to exhibit the functions of the virtual space server 20. Furthermore, a computer-readable storage medium that memorizes the one or more computer programs is also provided.

Furthermore, the effects described in this specification are merely exemplary or illustrative, and not restrictive. That is, the technology according to the present disclosure can exhibit other effects apparent to those skilled in the art from the description of this specification, in addition to the effects described above or instead of the effects described above.

Note that the present technology can also have the following configurations.

(1)
An information processing apparatus including
a control unit that controls a behavior of a virtual object associated with a user in a virtual space in accordance with an operation of the user, in which
the control unit performs control to generate the behavior of the virtual object on the basis of sensing data in a real space of the user and reflect the behavior in the virtual object during a non-operation period of the user.

(2)
The information processing apparatus according to (1), in which the sensing data includes information regarding at least one of a state or a position of the user.

(3)
The information processing apparatus according to (1) or (2), in which the control unit generates the behavior of the virtual object with reference to a database in which a candidate for the behavior of the virtual object is associated with at least one of one or more states or positions.

(4)
The information processing apparatus according to (3), in which in the reference, the control unit calculates a matching rate between the candidate for each behavior defined in the database and the sensing data, selects one behavior from the candidate for the each behavior on the basis of the matching rate, and generates the behavior of the virtual object.

(5)
The information processing apparatus according to (3) or (4), in which the control unit generates the behavior of the virtual object in accordance with a privacy level set for the candidate for the each behavior.

(6)
The information processing apparatus according to (5), in which in a case where the privacy level of the one behavior selected from the candidate of the each behavior is a level that is not permitted for another user who views an avatar that is the virtual object, the control unit performs control to generate a general behavior as a behavior of the avatar.

(7)
The information processing apparatus according to (6), in which the control unit randomly selects, as the general behavior, a behavior from the candidate for the each behavior.

(8)
The information processing apparatus according to (6), in which the control unit generates the general behavior on the basis of a behavior history of each avatar in the virtual space.

(9)
The information processing apparatus according to any one of (1) to (8), in which when the virtual object is reflected, the control unit performs control to change an appearance of the virtual object to an appearance associated with the behavior generated.

(10)
The information processing apparatus according to any one of (1) to (9), in which the control unit performs control to generate an image from a user viewpoint in the virtual space and transmit the image to a user terminal.

(11)
The information processing apparatus according to any one of (1) to (10) further including a communication unit, in which
the communication unit receives the sensing data from the user terminal.

(12)
An information processing method including,
by a processor,
controlling a behavior of a virtual object associated with a user in a virtual space in accordance with an operation of the user, and furthermore,
performing control to generate the behavior of the virtual object on the basis of sensing data in a real space of the user and reflect the behavior in the virtual object during a non-operation period of the user.

(13)
A program that causes
a computer to
function as a control unit that controls a behavior of a virtual object associated with a user in a virtual space in accordance with an operation of the user, in which
the control unit performs control to generate the behavior of the virtual object on the basis of sensing data in a real space of the user and reflect the behavior in the virtual object during a non-operation period of the user.

REFERENCE SIGNS LIST

10 User terminal
110 Communication unit
120 Control unit
121 State recognizer
130 Operation input unit
140 Motion sensor
150 Position measurer
160 Display unit
170 Audio output unit
180 Storage
20 Virtual space server
210 Communication unit
220 Control unit
221 Avatar behavior generator
222 Avatar control unit
230 Storage

The invention claimed is:

1. An information processing apparatus comprising:
circuitry configured to
control generation of a first behavior of a virtual object in a virtual space, wherein the first behavior corresponds to a first action instructed by a user,
control generation of a second behavior of the virtual object, wherein the second behavior is associated with sensing data obtained from the user in a real space, when there is not a second action instructed by the user toward the virtual space, and
reflect the first behavior or the second behavior of the virtual object according to each action instructed by the user.

2. The information processing apparatus according to claim 1,
wherein the sensing data includes information regarding at least one of a state or a position of the user.

3. The information processing apparatus according to claim 1,
wherein the circuitry controls generation of each behavior of the virtual object with reference to a database in which a candidate for the behavior of the virtual object is associated with at least one state or position among one or more states or positions.

4. The information processing apparatus according to claim 3,
wherein in the reference, the circuitry is further configured to
calculate a matching rate between the candidate for each behavior defined in the database and the sensing data, selects one behavior from the candidate for each behavior based on the matching rate, and
control generation of the selected behavior of the virtual object.

5. The information processing apparatus according to claim 3,
wherein the circuitry controls generation of each behavior of the virtual object in accordance with a privacy level set for the candidate for each behavior.

6. The information processing apparatus according to claim 5,
wherein the virtual object includes an avatar, and
wherein in a case where the privacy level of a behavior selected from the candidate of each behavior is a level that is not permitted for another user who views the avatar, the circuitry is further configured to control generation of a general behavior as a behavior of the avatar.

7. The information processing apparatus according to claim 6,
wherein the circuitry is further configured to randomly select, as the general behavior, a behavior from the candidate for each behavior.

8. The information processing apparatus according to claim 6,
wherein the circuitry controls generation of the general behavior based on a behavior history of each avatar in the virtual space.

9. The information processing apparatus according to claim 1,
wherein when the virtual object is reflected, the circuitry is further configured to perform control to change an appearance of the virtual object to an appearance associated with the behavior generated.

10. The information processing apparatus according to claim 1,
wherein the circuitry is further configured to
control generation of an image from a user viewpoint in the virtual space, and
transmit the image to a user terminal.

11. The information processing apparatus according to claim 10,
wherein the circuitry is further configured to receive the sensing data from the user terminal.

12. An information processing method comprising:
controlling, by a processor, generation of a first behavior of a virtual object in a virtual space, wherein the first behavior corresponds to a first action instructed by a user;
controlling, by the processor, generation of a second behavior of the virtual object, wherein the second behavior is associated with sensing data obtained from the user in a real space, when there is not a second action instructed by the user toward the virtual space; and
reflecting, by the processor, the first behavior or the second behavior of the virtual object according to each action instructed by the user.

13. A non-transitory computer-readable storage medium having embodied thereon a program, which when executed by a computer causes the computer to execute a method, the method comprising:
controlling generation of a behavior of a virtual object in a virtual space, wherein the first behavior corresponds to a first action instructed by a user;
controlling generation of a second behavior of the virtual object, wherein the second behavior is associated with sensing data obtained from the user in a real space, when there is not a second action instructed by the user toward the virtual space; and
reflecting the first behavior or the second behavior of the virtual object according to each action instructed by the user.

* * * * *